(12) United States Patent
Rancour et al.

(10) Patent No.: US 6,233,117 B1
(45) Date of Patent: May 15, 2001

(54) ELECTRICALLY CONDUCTIVE PATH BETWEEN HEAD ASSEMBLY AND GIMBAL ASSEMBLY IN MAGNETIC DISC DRIVE

(75) Inventors: Michael L. Rancour, Minnetonka; Mark E. Troutman, Long Lake; Albert L. Tervalon, III, Savage, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1169 days.

(21) Appl. No.: 08/550,514

(22) Filed: Oct. 30, 1995

Related U.S. Application Data

(63) Continuation of application No. 08/275,979, filed on Jul. 15, 1994, now abandoned.

(51) Int. Cl.[7] .................................................. G11B 5/60
(52) U.S. Cl. .......................................................... 360/234.5
(58) Field of Search .................................. 360/104, 103, 360/105, 234.5, 245, 245.9, 234.6

(56) References Cited

U.S. PATENT DOCUMENTS

| | | | |
|---|---|---|---|
| 4,317,149 | 2/1982 | Elser et al. | 360/126 |
| 4,761,699 | * 8/1988 | Aimslie et al. | 360/104 |
| 4,800,454 | 1/1989 | Schwarz et al. | 360/103 |
| 4,841,395 | 6/1989 | Craft | 360/103 |
| 4,972,286 | 11/1990 | Jurisch et al. | 360/126 |
| 5,001,583 | * 3/1991 | Matsuzaki | 360/104 |
| 5,001,591 | 3/1991 | Nakashima | 360/126 |
| 5,048,175 | 9/1991 | Jurisch et al. | 29/603 |
| 5,142,425 | 8/1992 | Gailbreath, Jr. et al. | 360/123 |
| 5,296,983 | * 3/1994 | Blanc et al. | 360/104 |
| 5,305,167 | * 4/1994 | Nagase et al. | 360/104 |
| 5,343,344 | * 8/1994 | Nagase | 360/104 |
| 5,384,432 | * 1/1995 | Noro et al. | 360/104 |
| 5,414,576 | * 5/1995 | Ueki et al. | 360/104 |
| 5,422,764 | * 6/1995 | McIlvanie | 360/106 |

FOREIGN PATENT DOCUMENTS

| | | | | |
|---|---|---|---|---|
| 54-102111 | * | 8/1979 | (JP) | 360/104 |
| 93014495 | * | 7/1993 | (JP) | 360/104 |

OTHER PUBLICATIONS

IBM Technical Disclosure Bulletin (vol. 24, No. 10, Mar. 1982), p. 4915.*
IBM Technical Disclosure Bulletin (vol. 24, No. 10, Mar. 1982, p. 4915).*

* cited by examiner

*Primary Examiner*—Allen T. Cao
(74) *Attorney, Agent, or Firm*—Westman, Champlin & Kelly, P.A.

(57) ABSTRACT

A magnetic disc drive includes a magnetic disc having a surface for storing information. The disc drive includes a drive chassis which forms an electrical ground. A head assembly reads and write information on the disc surface. An armature extends across the disc surface and positions the head assembly over the disc surface. A gimbal assembly at the end of the armature couples to the head assembly. Electrically conductive metal paths extend between the head assembly and the gimbal assembly, thereby coupling the head assembly to electrical ground.

16 Claims, 5 Drawing Sheets

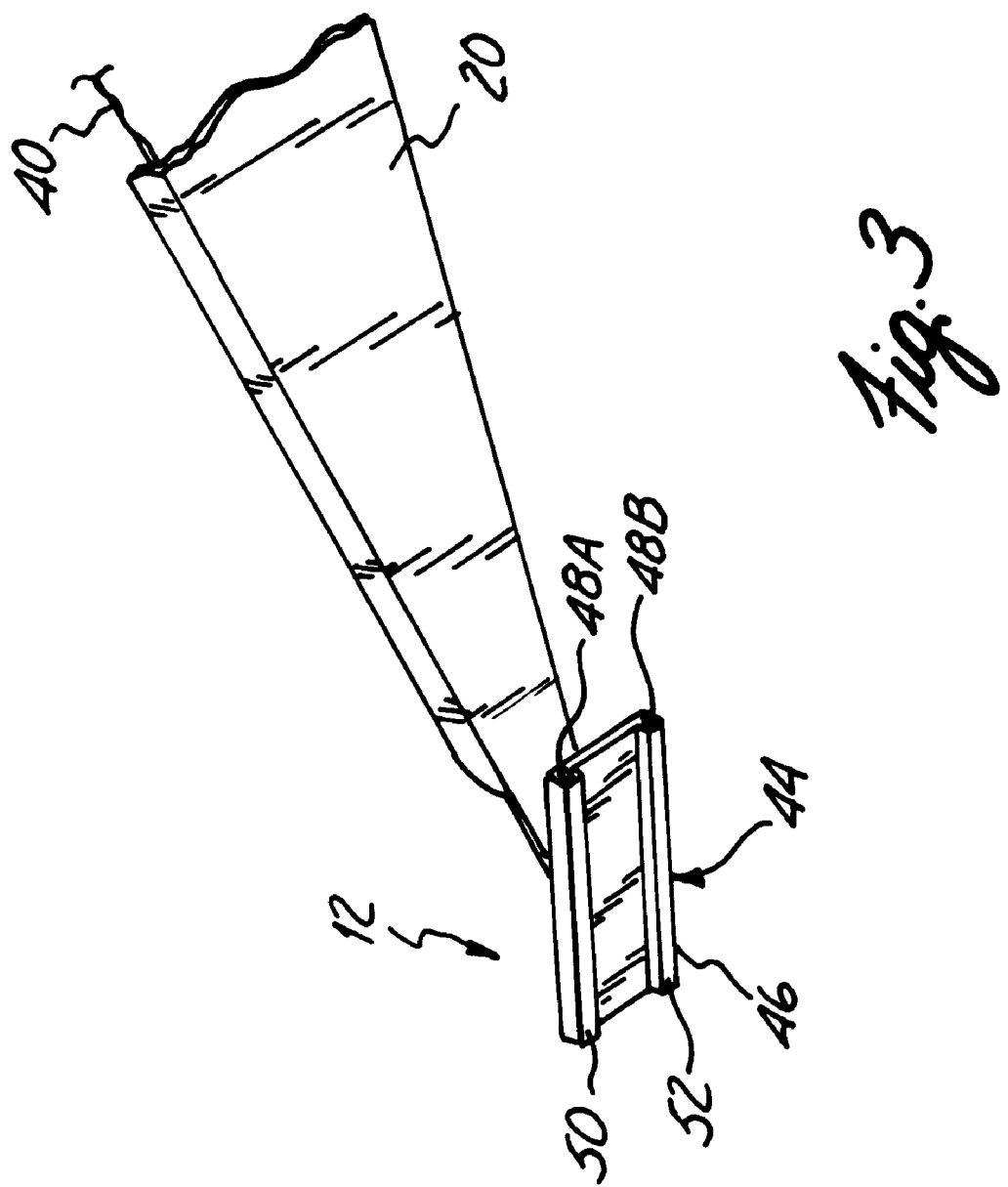

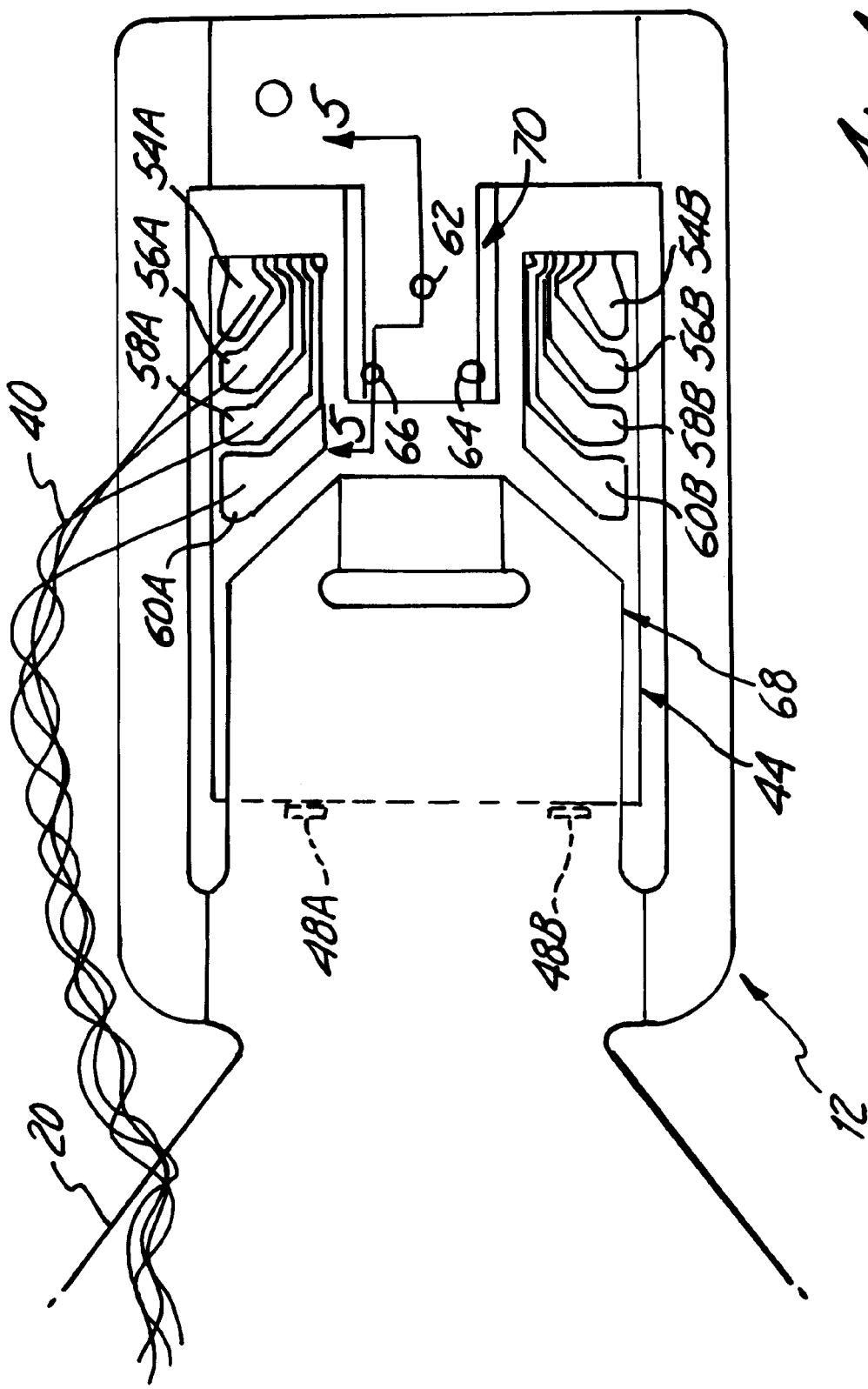

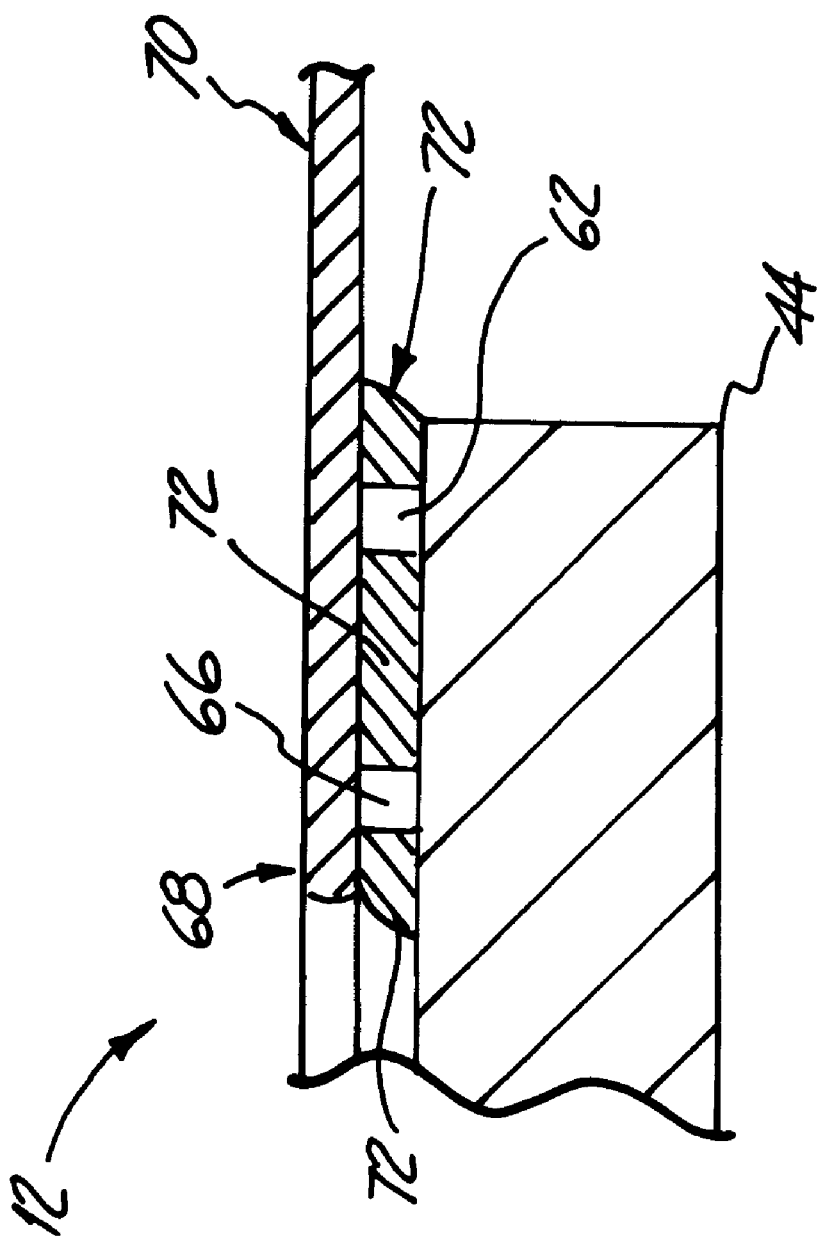

ELECTRICALLY CONDUCTIVE PATH BETWEEN HEAD ASSEMBLY AND GIMBAL ASSEMBLY IN MAGNETIC DISC DRIVE

This is a continuation of application Ser. No. 08/275,979, filed Jul. 15, 1994 abandoned. Priority of the prior application is claimed pursuant to 35 USC § 120.

BACKGROUND OF THE INVENTION

The present invention relates to the field of disc drive data storage devices. More specifically, the invention relates to providing an electrical path between a head assembly and a gimbal assembly in a magnetic disc drive.

Disc drive data storage devices of the "Winchester" type are well known in the industry. Such devices utilize rigid discs coated with a magnetizable medium for storage of digital information in a plurality of circular concentric tracks. This information is written to and read from the discs using a transducing head carried on a head assembly mounted on an actuator mechanism which moves the head from track to track across the surface of the disc under control of electronic circuitry. The discs are mounted for rotation on a spindle motor which causes the discs to spin and the surface of the discs to pass under the head.

In such a disc drive, the head assembly "flies" over the surface of the disc as the disc rotates at high speed. The head assembly includes a transducing head which is carried on a slider which has aerodynamic properties allowing the head assembly to fly. The head assembly is mounted on a gimbal assembly which is carried on a load beam armature coupled to the actuator mechanism. The gimbal assembly allows the head assembly to tilt, thereby achieving aerodynamic equilibrium. The armature is spring loaded and counteracts a lifting force from the slider as the head assembly flies across the disc surface. The spring loaded armature and the aerodynamic lifting force reach an equilibrium based upon the aerodynamic properties of the slider and the speed of rotation of the disc.

It is important to provide an electrical ground to the head assembly through the armature to the chassis of the disc drive. This helps reduce the buildup of static electricity on the head assembly which can arc to the storage disc. Further, the electrical grounding of the head assembly helps reduce noise during readback of magnetically encoded information.

Typical prior art techniques of achieving an electrical connection between the head assembly and the gimbal assembly have included the use of a conductive adhesive. However, the conductive adhesive suffers from a number of drawbacks including increased labor and material costs as well as relatively high resistivity.

In the prior art, adhering the head assembly to the gimbal assembly required a number of manual steps. First, a non-conducting adhesive was applied to the gimbal assembly. This adhesive was typically non-conducting so as not to electrically short electrical contact pads carried on the head assembly. After the head assembly was bonded to the gimbal assembly, a second electrically conductive adhesive was manually applied. The second adhesive was applied around the edge of the interface between the head assembly and the gimbal assembly. This technique does not lend itself to automated assembly lines.

In typical prior art disc drives, the average resistivity of head gimbal assemblies, as measured between the head assembly and the gimbal assembly in which the head assembly is attached to the gimbal assembly through a conductive adhesive, was approximately 400 Ω with some ranging above 1000 Ω.

SUMMARY OF THE INVENTION

The present invention provides a conductive path between a head assembly and a gimbal assembly in a magnetic disc drive. In the present invention, a magnetic disc drive includes a rotating magnetic storage disc rotatably mounted to a drive chassis which provides an electrical ground. A head assembly is used for reading and writing information on the disc surface and includes a slider and a transducing head which are adapted to fly over the disc surface as the disc rotates. An armature extends across the disc surface and includes an end adapted for carrying the head assembly across adjacent tracks on the surface of the disc. A gimbal assembly is carried on the end of the armature and allows movement of the head assembly relative to the plane of the surface of the storage disc. The head assembly is attached to the gimbal assembly. An electrically conductive metal path extends between the head assembly and the gimbal assembly, thereby electrically coupling the head assembly to electrical ground. In one embodiment, the electrically conductive metal path extends through an adhesive.

In a preferred embodiment, the conductive metal path is formed of gold. Typically, the resistance of the conductive metal path between the head assembly and the gimbal is less than about 460 Ω. In one embodiment, a plurality of electrically conductive metal paths extend between the head assembly and the gimbal assembly.

The method of the present invention includes providing a mask over a surface of the head assembly. An electrically conductive layer is deposited on the surface of the head assembly through the mask. In one embodiment, the same mask is used to deposit the electrically conductive path as well as bonding pads which couple the transducing head.

BRIEF DESCRIPTION OF THE DRAWINGS

FIG. 3 is a bottom perspective view of the armature and head gimbal assembly of FIG. 2.

FIG. 4 is a detailed view of the head gimbal assembly of the present invention.

FIG. 5 is a cross-sectional view of an interface between the gimbal assembly and the head assembly shown in FIG. 4 taken along the line labeled 5—5 in FIG. 4.

DETAILED DESCRIPTION OF THE PREFERRED EMBODIMENTS

Figure 1:
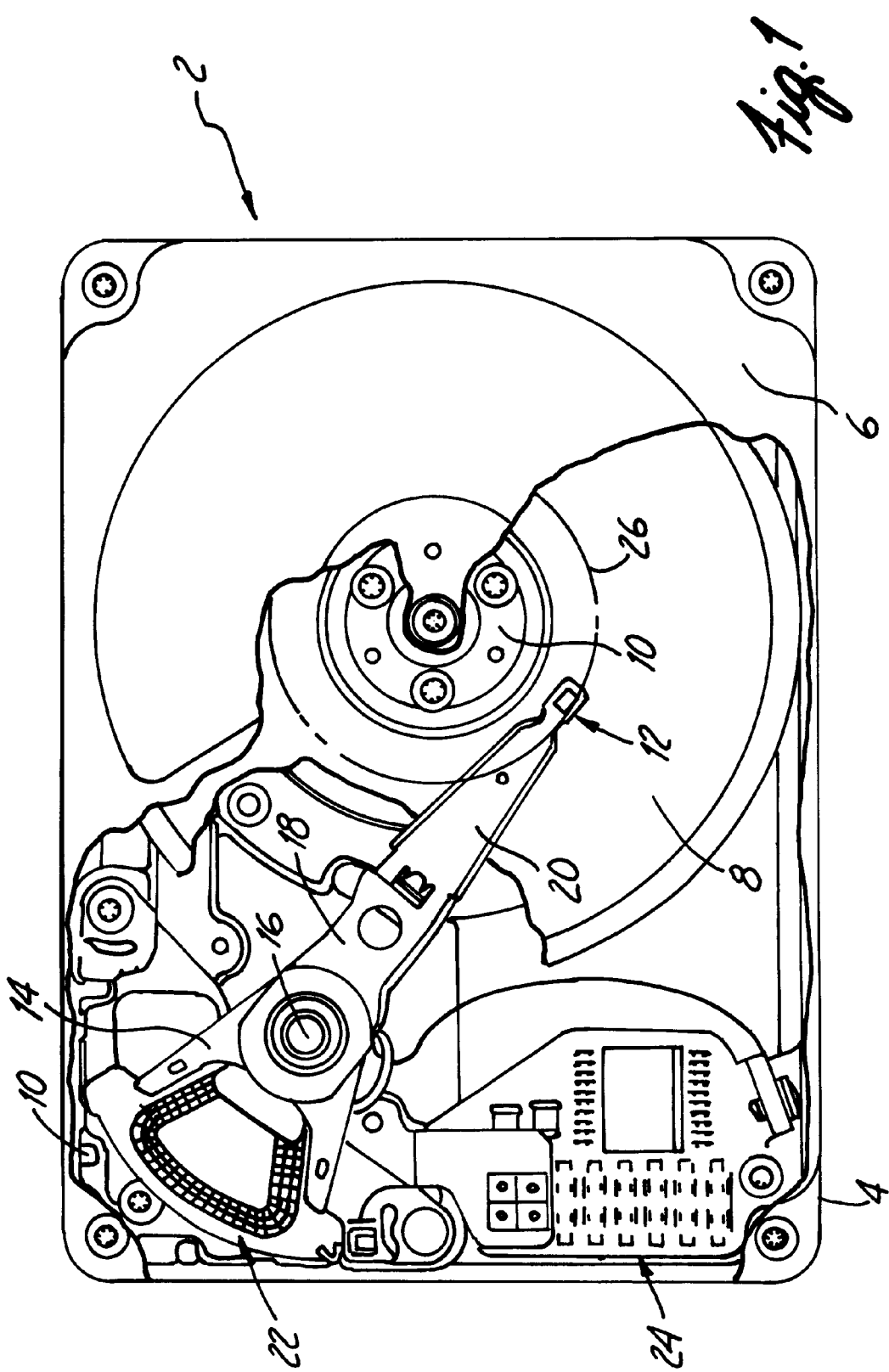
FIG. 1 is a top plan view of a disc drive data storage device in which the present invention is useful.

FIG. 1 shows a plan view of a disc drive 2 for use with the present invention. Disc drive 2 includes a base member or chassis 4 to which internal components of the unit are mounted. Base member 4 couples to top cover 6 which forms a sealed environment for critical parts of disc drive 2.

Disc drive 2 includes a plurality of discs 8 which are mounted for rotation on a spindle motor, shown generally at 10. A plurality of head gimbal assemblies (HGA) 12, usually one per disc surface, are mounted to an actuator 14. In the example shown at drive 2, actuator 14 is a rotatory actuator mounted for pivoting about a pivot axis 16. Actuator 14 includes a number of mounting arms 18 which couple head gimbal assemblies 12 to the actuator body via a plurality of load beam armatures 20. Actuator motor 22 is also coupled to actuator body 14 to provide a force to move assembly 12 to a desired position on the surface of disc 8.

In operation, the spindle motor 10 causes disc 8 to rotate. Electronic circuitry 24 energizes actuator motor 22 causing actuator 14 to rotate about pivot 16 whereby magnetic read/write head assembly 12 is moved through an arc radially across the surface of disc 8. Actuator 14 positions head assembly 12 over a concentric track, for example track 26 of disc 8. This allows electronic circuitry 24 to read back or write information at desired locations on disc 8.

Figure 2:
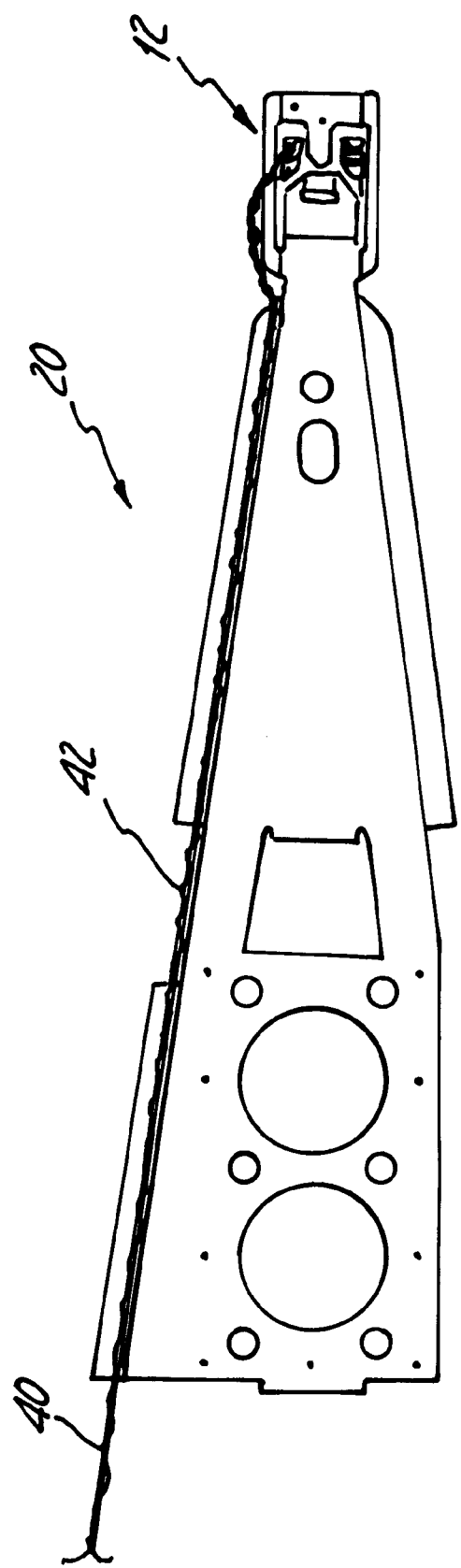
FIG. 2 is a top plan view of an armature coupled to a head gimbal assembly in accordance with the present invention.

FIG. 2 is a top plan view of load beam armature 20 and head gimbal assembly 12. Armature 20 is supported on mounting arm 18, shown in FIG. 1. A multi-conductor wire 40 travels along the length of armature 20 and couples to bonding pads on a head assembly (not shown in FIG. 2) of head gimbal assembly 12. Load beam armature 20 is bent at bend 42 to provide a spring loaded force to counteract aerodynamic forces on assembly 12. These aerodynamic forces and the spring constant of load beam 20 reach an equilibrium whereby head gimbal assembly "flies" over the surface of disc 8. This "flying" allows head gimbal assembly 12 to be in close proximity with the surface of disc 8 without actually touching the surface of disc 8.

FIG. 3 shows a bottom perspective view of load beam armature 20 and head gimbal assembly 12. FIG. 3 shows conductive wiring 40 extending from a proximal end (not shown in FIG. 3) of load beam armature 20. Head gimbal assembly 12 couples to a distal end of armature 20. As shown in FIG. 3, head gimbal assembly 12 includes head assembly 44 which comprises slider 46 and transducing heads 48A,48B, which is carried on the trailing edge of slider 46. Wires 40 couple to transducing heads 48A,48B. Slider 46 includes rails 50 and 52. The body of slider 46 and rails 50 and 52 cause the aforementioned aerodynamic lifting effect.

During operation, static electricity can build up on head assembly 12. For proper operation of disc drive 2, it is important for this static electricity to have a path to electrical ground. Load beam assembly 20 and arm 18 are electrically conductive and thereby provide an electrical connection to chassis 4. The present invention provides an electrical connection between head assembly 44 and the gimbal assembly (shown in FIG. 4) of head gimbal assembly 12, thereby providing an electrical ground for head assembly 44.

FIG. 4 is a top plan view showing head gimbal assembly 12 in greater detail. Head gimbal assembly 12 includes head assembly 44 which carries transducing heads 48A,48B. A top side of head assembly 44 carries bonding pads 54A, 56A, 58A and 60A which couple to transducing head 48A and pads 54B, 56B, 58B and 60B which couple to transducing head 48B.

FIG. 4 also shows conductive metal paths 62, 64 and 66, in accordance with the present invention, which extend between head assembly 44 and gimbal assembly 68 of HGA 12. In a third embodiment, conductive paths 62, 64 and 66 are formed of gold. As described below, this gold can be deposited during the same step used to deposit electrical pads 54A through 60A and 54B through 60B. Conductive paths 62, 64 and 66 form electrical contacts with tab 70 of gimbal assembly 68.

FIG. 5 shows a more detailed cross-sectional view of head gimbal assembly 12 taken along the line labeled 5—5 in FIG. 4. FIG. 5 shows tab 70 of gimbal assembly 68 coupled to head assembly 44 through conductive paths 62 and 66. FIG. 5 also shows an adhesive 72 which bonds head assembly 44 to gimbal assembly 68. In one embodiment, this adhesive is a non-conductive adhesive which reduces the chance of electrical shorts between electrical contacts 54A through 60A and 54B through 60B.

In a preferred embodiment, electrical paths 62 through 66 are applied to head assembly 44 as pads 54A,54B through 60A,60B are deposited. Paths 62 through 66 are fabricated by adding three circular features to a gold layer top bond pad mask. The mask overlies head assembly 44 allowing metal to be deposited through the mask in accordance with the invention. The resulting paths 62, 64 and 66 have the same thickness as top bond pads 54A,54B through 60A,60B. Adhesive 72 is then applied to gimbal assembly 68. When head 44 is adhered to gimbal assembly 68 with adhesive 72, electrical paths 62 through 66 contact gimbal assembly 68 and provide an electrically conductive path. Bond pads 54A,54B, 60A,60B are about $100\mu$ in for wire bonding. It turns out that this thickness is high enough to improve conductivity but low enough not to degrade the adhesive bond strength. Being able to use the same thickness for both greatly simplifies processing.

The present invention has yielded average resistances between head assemblies 44 and gimbal assemblies 68 of 157 $\Omega$. Further, there is less variation in resistance between samples than in prior art designs using conductive adhesives. The maximum resistance obtained was 461 $\Omega$.

The present invention yields a method of fabrication which is easily automated. The present invention does not require the addition of a conductive adhesive which, in the prior art, was typically applied manually. Further, the cost of purchasing a conductive adhesive can be reduced with the present invention.

Although the present invention has been described with reference to preferred embodiments, workers skilled in the art will recognize that changes may be made in form and detail without departing from the spirit and scope of the invention. For example, the present invention can be employed using the addition of a conductive adhesive. Further, any combination of the conductive path of the invention with conductive and/or non-conductive, structural and/or non-structural adhesives can be employed.

What is claimed is:

1. A magnetic disc drive for reading and writing information on a disc surface of a rotating magnetic disc, comprising:

a drive chassis forming an electrical ground;

a head assembly including a transducing head for reading and writing information on the disc surface, the head assembly further including a slider having a slider surface adapted to fly over the disc surface as the disc rotates wherein the transducing head is connected to the slider;

an electrically conductive armature extending across the disc surface having a first end electrically connected to electrical ground and a second end for carrying the head assembly;

a gimbal assembly at the second end of the armature and connected to electrical ground;

an adhesive which adheres the head assembly to the gimbal assembly; and an electrically conductive metal path affixed to one of the slider and the gimbal assembly, and providing an unbonded electrical connection to the other of the slider and gimbal assembly, the metal path being electrically isolated from the transducing head and sandwiched between the head assembly and the gimbal assembly thereby coupling the head assembly to electrical ground, wherein the metal path is positioned between the head assembly and the gimbal assembly.

2. The magnetic disc drive of claim 1 wherein the conductive metal path is gold.

3. The magnetic disc drive of claim 1 wherein the conductive metal path extends through the adhesive.

4. The magnetic disc drive of claim 1 wherein the resistance of the conductive metal path is approximately 157 Ω.

5. The magnetic disc drive of claim 1 including a plurality of conductive metal paths extending between the head assembly and the gimbal assembly.

6. A method of providing an electrically conductive path between a gimbal assembly and a transducing head assembly of a head gimbal assembly in a magnetic disc storage system, comprising:

obtaining the gimbal assembly;

obtaining the head assembly having a slider;

adhering the head assembly to the gimbal assembly with an adhesive; and providing a conductive metal path affixed to one of the slider and the gimbal assembly and providing an unbonded electrical connection to the other of the slider and the gimbal assembly, the metal path being sandwiched between the head assembly and the gimbal assembly and forming an electrical path directly therebetween.

7. The method of claim 6 including forming electrical bonding pads on the head assembly which couple to a transducing head.

8. The method of claim 6 wherein the conductive metal path comprises gold.

9. The method of claim 6 including depositing an adhesive between the gimbal assembly and the head assembly and the conductive path extends through the adhesive.

10. The method of claim 6 wherein the conductive path has a resistance of approximately 157 Ω.

11. The method of claim 6 including forming a plurality of conductive metal paths between the head assembly and the gimbal assembly.

12. The method of claim 7 wherein the pads are deposited through a bonding pad mask.

13. The method of claim 12 including using the bonding pad mask to form the electrically conductive metal path.

14. The magnetic disc drive of claim 1 wherein the slider carries a plurality of bonding pads each having a thickness, and wherein the conductive metal pad is about the same thickness as the bonding pads.

15. The magnetic disc drives of claim 1 wherein the slider includes a top side, and the slider carries a plurality of bonding pads on the top side; wherein the gimbal includes a tab portion; wherein the tab portion is adhered to the head assembly; and wherein the conductive metal path is in direct contact with the tab portion.

16. The magnetic disc drive of claim 15 wherein the bonding pads are formed in two spaced-apart groups, and wherein the tab extends between the two groups.

* * * * *